United States Patent
Warren

(10) Patent No.: US 10,612,712 B2
(45) Date of Patent: Apr. 7, 2020

(54) PLUG FOR SERVICING ACTIVE PIPE

(71) Applicant: Warren Environmental, Inc., Carver, MA (US)

(72) Inventor: Danny Warren, Carver, MA (US)

(73) Assignee: Warren Environmental & Coating, LLC, Middleborough, MA (US)

( * ) Notice: Subject to any disclaimer, the term of this patent is extended or adjusted under 35 U.S.C. 154(b) by 170 days.

(21) Appl. No.: 15/893,003

(22) Filed: Feb. 9, 2018

(65) Prior Publication Data

US 2018/0224045 A1    Aug. 9, 2018

Related U.S. Application Data

(60) Provisional application No. 62/456,702, filed on Feb. 9, 2017.

(51) Int. Cl.
| | |
|---|---|
| *F16L 55/12* | (2006.01) |
| *F16L 55/128* | (2006.01) |
| *F16L 55/134* | (2006.01) |
| *E03F 5/04* | (2006.01) |
| *E03F 7/02* | (2006.01) |
| *E03F 3/06* | (2006.01) |
| *E03F 5/042* | (2006.01) |

(52) U.S. Cl.
CPC .......... *F16L 55/128* (2013.01); *E03F 5/0411* (2013.01); *E03F 7/02* (2013.01); *F16L 55/134* (2013.01); *E03F 5/042* (2013.01); *E03F 2003/065* (2013.01)

(58) Field of Classification Search
CPC ..... F16L 55/128; F16L 55/134; F16L 55/136; F16L 55/1283
USPC ....................... 138/93, 89; 73/49.8
See application file for complete search history.

(56) References Cited

U.S. PATENT DOCUMENTS

| | | | |
|---|---|---|---|
| 7,240,697 B2* | 7/2007 | Beebe | F16L 55/134 138/89 |
| 7,866,347 B2* | 1/2011 | Bowie | F16L 55/124 138/89 |
| 9,463,923 B2* | 10/2016 | Noyon | F16L 55/11 |
| 10,295,103 B1* | 5/2019 | Berube | F16L 55/134 |
| 2009/0114302 A1* | 5/2009 | Yeazel | F16L 55/124 138/90 |
| 2016/0061372 A1* | 3/2016 | Sawchuk | F15D 1/025 138/39 |

* cited by examiner

*Primary Examiner* — Patrick F Brinson
(74) *Attorney, Agent, or Firm* — Barlow, Josephs & Holmes, Ltd.

(57) ABSTRACT

A modular plug for installation into large diameter pipelines that provides a reliable and secure seal within the pipeline to be serviced thereby increasing the safety of the people working on the secured side of the plug. The plug is modular in construction and suited for easy installation within large pipelines. The plug is generally formed as a large circular plate formed from modular sections. Along the division lines the plug pieces include grooves and a gasket therein. Reinforcing jacks extend outwardly from the plug and exert pressure against the pipeline to retain the plug geometry and position. Also, around the periphery of the plug is shown an inflatable rubber seal.

11 Claims, 2 Drawing Sheets

PLUG FOR SERVICING ACTIVE PIPE

CROSS-REFERENCE TO RELATED APPLICATIONS

This application is related to and claims priority from earlier filed U.S. Provisional Patent Application No. 62/456,702, filed Feb. 9, 2017.

BACKGROUND OF THE INVENTION

The present invention relates generally to a device used to temporarily plug an underground active pipeline. More specifically, the present invention relates to a plug assembly for installation into large diameter active pipelines that stops the flow of fluids therethrough and allows safe entry and servicing of the pipeline.

When the walls of an underground pipeline have been damaged such that the walls are cracked, pitted or spalled or when a joint in the pipeline fails fluids transported by the pipeline may leak out of the pipeline or underground water may leak into the pipeline. In such situations, it is desirable to repair the damaged pipeline wall or joint to prevent further leakage. When repairing such a damaged pipeline, it has been usual to repair a long pipeline as a whole, by inserting a tubular lining material into the pipeline against the wall thereof and hardening the lining material against the inner wall surface of the pipeline.

Methods for repairing a sewer pipe, for example, involve applying lengthy tubular sheet material, which is prepared from a thickened solution of a curable resin in which high-strength fibers are dispersed, onto the inner surface of the pipeline, bring it into intimate contact with the inner surface of the pipeline and heating it to cure the resin in the sheet material. If a long pipeline is only partly damaged, however, it is undesirable from an economic standpoint to line the whole pipeline and it is desirable to repair only its damaged part.

When lining a sewer pipe by a method as described above, the line must be temporarily taken out of service to allow the repair to be made. Further, the pipeline may have openings therein that allow infiltration of significant ground water. Therefore, it is very likely that water may hinder the curing reaction of the resin, or that the cooling action of water may delay the effective heating of the resin and its curing.

In order to take these pipelines out of service, the line needs to be effectively plugged for a period of time. This prevents flow through the pipeline but causes a backup behind the plug. The traditionally available plug for such an application is an inflatable air bag that is placed into the pipeline. However, these prior art inflatable plugs are relatively large when compared to the size of the pipes being plugged, and they are also comprised of relatively inflexible material such that they may be difficult to insert into the pipe. For example, in the case of a horizontal pipe it may be necessary to insert the plug vertically downwardly through a manhole and then turn the plug 90° such that it can be inserted horizontally into a pipe. Due to the large size and relative inflexibility of the prior art inflatable plugs, such manipulation of the plugs may be difficult.

In view of the foregoing, there is a need for a large diameter pipeline plug that allows easy and reliable installation in an active pipeline. There is also a need for a modular, large diameter pipeline plug that can easily be handled to facilitate installation in space restricted environments. There is a further need for a large diameter pipeline plug that includes various access, drain and inspection ports to facilitate the operation of the lining system ongoing within the pipeline while insuring safety for the workers operating within the environment.

BRIEF SUMMARY OF THE INVENTION

In this regard, the present invention provides a large diameter pipeline plug that is modular in construction and suited for easy installation within large pipelines. The plug is generally formed in modular sections such as illustrated wherein three pieces are illustrated such that the plug is divided essentially into thirds along a horizontal axis thereof. It should be appreciated that while one possible modularization is depicted, the plug could be divided into other arrangements having more or less pieces and having division lines extending both horizontally and/or vertically. Along the division lines the edges of the plug pieces include one or more grooves therein that receive a gasket therein. The gasket engages with the adjacent plug pieces to serve both as mechanical engagement to resist pressure against the plug and to prevent displacement of the plug pieces relative to one another as well as sealing the seams against leakage.

Each plug piece is shown to include handles to make maneuvering and handling of the plug pieces easier as they are being installed or removed.

Around the peripheral edge of the plug there are shown reinforcing jacks. The jacks are configured to extend outwardly from the plug and contact the pipeline wall. These jacks exert pressure against the pipeline to assist in preventing the plug from being displaced along the pipeline. Further, the jacks cause an inward pressure on the plug to keep the seams between the plug pieces tight. The jacks are shown as hydraulic but may be mechanical such as extendible bolts or the like.

Also, around the periphery of the plug is shown an inflatable rubber seal. The inflatable seal is affixed to the edge of the plug. When air pressure is applied, the seal inflates to engage with the wall of the pipeline. The seal contours to the shape of the pipeline wall to create a reliable seal as well as exerting pressure against the wall to assist in retaining the plug in the installed location.

The surface of the plug also includes several additional features. Numerous nipples are provided through the plug. The nipples provide locations through which cameras or other needed wiring or material supply tubing can be passed. Nipples are provided to allow both primary drainage relief via connected hoses and/or pumps as well as emergency drainage locations. All of the nipples described can be used by opening them, used by connection of hoses or gasketed pass through caps or sealed when not needed. Further, nipples are provided to allow ventilation of process by product, sewer gas, the introduction of fresh air and the like. This can also be done through passive exchange or by the connection of pressurized ventilation hoses.

Therefore, it is an object of the present invention to provide a large diameter pipeline plug that allows easy and reliable installation in an active pipeline. It is a further object of the present invention to provide a modular, large diameter pipeline plug that can easily be handled to facilitate installation in space restricted environments. It is still a further object of the present invention to provide a large diameter pipeline plug that includes various access, drain and inspection ports to facilitate the operation of the lining system ongoing within the pipeline while insuring safety for the workers operating within the environment.

BRIEF DESCRIPTION OF THE DRAWINGS

In the drawings which illustrate the best mode presently contemplated for carrying out the present invention.

DETAILED DESCRIPTION OF THE INVENTION

Disclosed herein is a modular plug for installation into large diameter pipelines. The modular design of the plug allows increased ease of handling and installation while also providing a more reliable and secure seal within the pipeline to be services thereby increasing the safety of the people working on the secured side of the plug.

Figure 1:
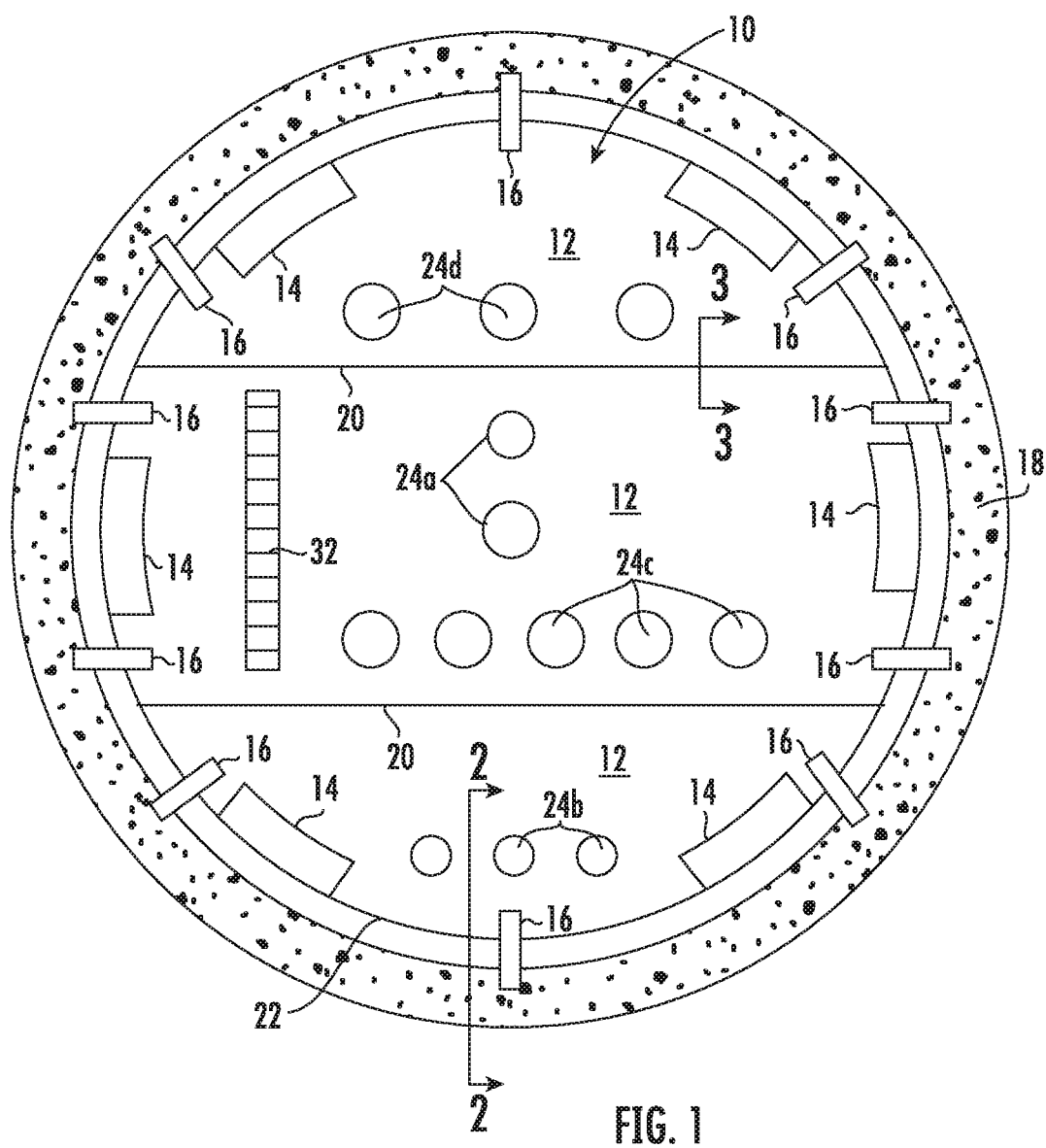
FIG. 1 is a front view of a modular pipe plug in accordance with the present invention.

In this regard, the present invention provides a large diameter pipeline plug that is modular in construction and suited for easy installation within large pipelines. As can be seen at FIG. 1, the plug 10 is generally formed as a large circular plate that is in turn constructed in modular sections 12 such as illustrated wherein three pieces are illustrated. In this manner, the plug 10 is divided essentially into thirds along a horizontal axis thereof. It should be appreciated that while one possible modularization is depicted, the plug 10 could be divided into other arrangements having more or less pieces for example the plug may have 2 pieces and be divided vertically. Further, the plug 10 may have pieces that are divided horizontally, vertically or a combination of both horizontally and/or vertically.

Each plug 10 piece 12 is shown to include handles 14. Handles are provided to make maneuvering and handling of the plug pieces 12 easier as they are being installed or removed. Handles may be of any type known to one skilled in the art and are not intended to be a limiting factor of the configuration of the plug 10, the pieces 12 thereof or the arrangement by which the pieces 12 are divided.

The plug pieces 12 may be formed from metal such as aluminum. Alternately the plug pieces 12 may be formed from glass reinforced polymers or epoxies. Still further the plug pieces may be formed from a combination of polymer components with metal reinforcements and edges.

Figure 2:
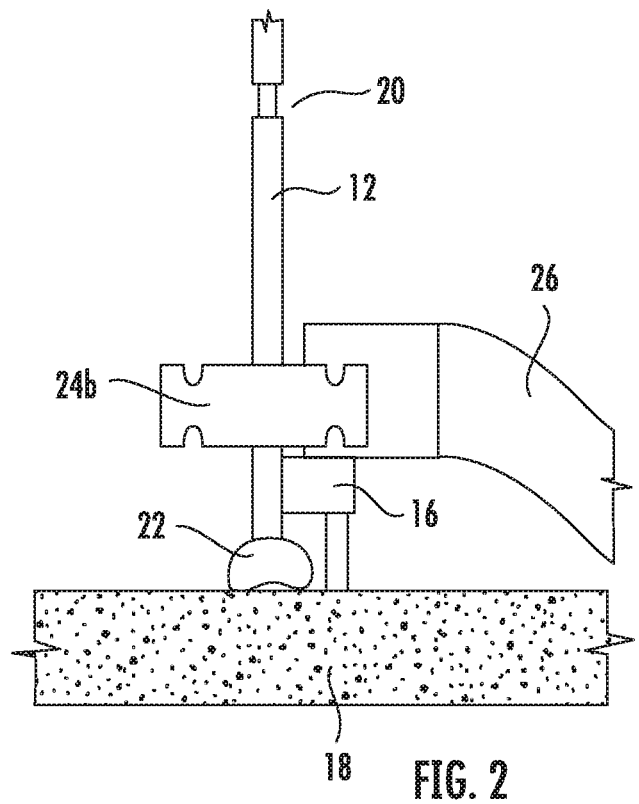
FIG. 2 is a cross-sectional view through the line 2-2 of FIG. 1.

Looking at FIGS. 1 and 2, around the peripheral edge of the plug there are shown reinforcing jacks 16. The jacks 16 are configured to extend outwardly from the plug 10 and contact the pipeline wall 18. These jacks 16 exert pressure against the pipeline wall 18 to assist in preventing the plug 10 from being displaced along the pipeline. Further, the jacks 16 cause an inward pressure on the plug pieces 12 to keep the seams 20 between the plug pieces 12 tight against one another thereby maintaining a seal. The jacks 16 are shown as hydraulic but may be mechanical such as extendible bolts or the like. Similarly, while the jacks 16 are shown to principally rely on friction against the pipeline wall 18 other arrangements may be employed, wherein the jacks are inserted into recesses formed in the pipeline wall or are welded to plates or studs that are initially installed into the pipeline wall prior to installation of the plug.

Positioned around the periphery of the plug 10 is shown an inflatable rubber seal 22. The inflatable seal 22 is affixed to the edge of the plug 10. When air pressure is applied, the seal 22 inflates to engage with the wall 18 of the pipeline. The seal 22 contours to the shape of the pipeline wall to create a reliable seal as well as exerting additional pressure against the wall to assist the jacks in retaining the plug in the installed location.

The plug 12 also includes several additional features. Numerous nipples are provided across the face of the plug that extend through the plug. Some of nipples 24a provide locations through which cameras, power wiring, other needed wiring or material supply tubing can be passed. The lower nipples 24b are provided to allow primary drainage relief. The drainage is facilitated via hoses 26 attached to lower nipples 24b that may in turn be connected to pumps. Further, nipples 24c may be provided as emergency drainage locations. Further, nipples 24d are provided to allow ventilation of process by-product, evaporated solvent, sewer gas, the introduction of fresh air and the like. This can also be done through passive exchange or by the connection of pressurized ventilation hoses. All of the nipples described are cam-loc style nipples as are modular and well known in the art. They can be used by opening them, used by connection of hoses or gasketed pass through caps or sealed when not needed.

Figure 3:
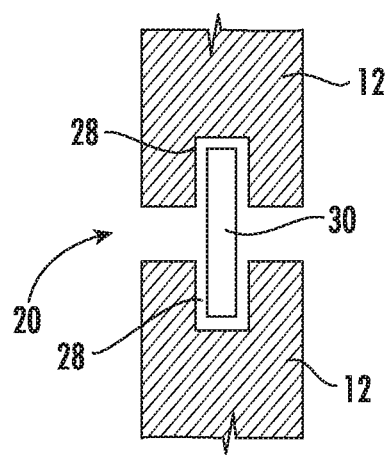
FIG. 3 is a cross-sectional view through the line 3-3 of FIG. 1.

As can be seen at FIG. 3, along the division lines 20, the edges of the plug pieces 12 include one or more grooves 28 therein that receive a gasket 30. The gasket 30 engages with the adjacent plug pieces 12 to serve both as mechanical engagement to resist pressure against the plug and to prevent displacement of the plug pieces relative to one another as well as sealing the division line 20 seams against leakage.

In an alternate embodiment, a site glass 32 may be provided so that workers can monitor the fluid level on the blocked pipeline side of the plug. This allows workers to respond if fluid levels are rising such that additional drainage is required.

It can be seen that the present invention to provides a large diameter pipeline plug that allows easy and reliable installation in an active pipeline. It can further be seen that the present invention to provides a modular, large diameter pipeline plug that can easily be handled to facilitate installation in space restricted environments while including various access, drain and inspection ports to facilitate the operation of the lining system ongoing within the pipeline while insuring safety for the workers operating within the environment.

Various other components may be included and called upon for providing for aspects of the teachings herein. For example, additional materials, combinations of materials and/or omission of materials may be used to provide for added embodiments that are within the scope of the teachings herein.

In the present application a variety of embodiments are described. It is to be understood that any combination of any of these variables can define an embodiment of the invention. Other combinations of articles, components, conditions, and/or methods can also be specifically selected from among variables listed herein to define other embodiments, as would be apparent to those of ordinary skill in the art.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed:

1. A structure for plugging a large diameter pipeline allowing physical entry thereto, comprising:
    a plug body;
    a plurality of jacks disposed about a peripheral edge of the plug body;

an inflatable seal disposed about said peripheral edge; and at least one nipple extending entirely through said plug body for attachment of drainage relief;

wherein said jacks engage with a wall of said pipeline to retain said plug body in an installed location within said pipeline and said inflatable seal seals the space between said peripheral edge of said plug body and said wall of said pipeline.

2. The structure of claim 1, wherein said plug body further comprises:

at least two plug pieces that interfit to form said plug body.

3. The structure of claim 2, wherein said plug pieces each include a groove in mating edges thereof and a gasket received within said grooves.

4. The structure of claim 2, wherein said plug body pieces have mating edges that run in a horizontal direction.

5. The structure of claim 2, wherein said plug body pieces have mating edges that run in a vertical direction.

6. The structure of claim 2, wherein said plug body pieces have mating edges that run in both a horizontal and vertical direction.

7. The structure of claim 2, wherein said plug body pieces have at least one handle thereon.

8. The structure of claim 1, wherein said plug body has at least one handle thereon.

9. The structure of claim 1, said at least one nipple further comprising:

a plurality of nipples extending through said plug body.

10. The structure of claim 9, wherein said nipples provide connection points for drainage, ventilation, cable access, inspection and/or material supply.

11. A structure for plugging a pipeline, comprising:

a plug body, said plug body divided into at least two plug pieces, said plug pieces having interfitting formations on respective mating edges;

a plurality of jacks disposed about a peripheral edge of the plug body;

an inflatable seal disposed about said peripheral edge; and at least one nipple extending entirely through said plug body for attachment of drainage relief;

wherein said jacks engage with a wall of said pipeline to retain said plug body in an installed location within said pipeline and said inflatable seal seals the space between said peripheral edge of said plug body and said wall of said pipeline.

\* \* \* \* \*